United States Patent [19]

Melton, III

[11] 4,328,915
[45] May 11, 1982

[54] UNIVERSAL QUICK RELEASE MOUNTING ASSEMBLY

[76] Inventor: Warren J. Melton, III, 5020 Amesbury, #2062, Dallas, Tex. 75206

[21] Appl. No.: 168,545

[22] Filed: Jul. 14, 1980

[51] Int. Cl.³ .............................................. A61G 7/06
[52] U.S. Cl. ................ 224/32 R; 224/32 A; 224/31; 248/229
[58] Field of Search ............... 224/30 R, 32 R, 32 A, 224/33 R, 39, 40, 42, 31; 248/229; 24/81 BA, 81 CC, 81 G, 81 CR, 263 A, 264; 280/289 A; 269/41, 43, 64

[56] References Cited

U.S. PATENT DOCUMENTS

| 1,460,760 | 7/1923 | McGee | 224/32 R X |
| 2,109,315 | 2/1938 | Harley | 224/32 |
| 2,527,433 | 10/1950 | Rochelle | 224/32 |
| 2,783,927 | 3/1957 | Harley | 224/32 |
| 2,890,819 | 6/1959 | Glenny | 224/32 |
| 2,944,712 | 7/1960 | Glenny | 224/32 A |
| 3,148,851 | 9/1964 | Condon | 248/229 X |
| 3,157,327 | 11/1964 | Karbin | 224/30 |
| 3,301,448 | 1/1967 | Inoue | 224/32 |
| 3,786,972 | 1/1974 | Alley | 224/31 |
| 3,795,354 | 3/1974 | Stippich | 224/32 A |
| 3,874,574 | 4/1975 | Heise | 224/31 |
| 3,899,149 | 8/1975 | Schneider | 248/229 X |
| 3,934,770 | 1/1976 | Larsen | 224/33 |
| 3,937,374 | 2/1976 | Hine, Jr. | 224/32 A |
| 3,995,803 | 12/1976 | Uitz | 224/33 A |
| 4,081,117 | 3/1978 | Crane | 224/39 |
| 4,096,980 | 6/1978 | Clow | 224/39 |
| 4,151,939 | 5/1979 | Jorjorian et al. | 224/33 R |
| 4,174,795 | 11/1979 | Jackson et al. | 224/32 A |

FOREIGN PATENT DOCUMENTS 89300 3/1957 Norway ........................... 224/30 R Primary Examiner—Steven M. Pollard
Attorney, Agent, or Firm—Richards, Harris & Medlock

[57] ABSTRACT

The specification discloses apparatus for mounting a loadcarrying apparatus such as a basket (10) to the carrier rack (12) on a conventional bicycle. The clamping assembly (22) includes an upper jaw (26) and a lower jaw (28) dimensioned to engage the horizontal support member (18) of the carrier rack. A bolt extending from lower jaw (28) through the upper jaw (26) is provided for compressing and releasing the clamping assembly. Rotation of a knob (68) threaded through the bolt outside of the upper jaw permits adjustment of the compression exerted by the jaws. A separate releasable locking assembly (24) connected to the loadcarrying structure is provided for receiving and engaging the nonhorizontal support member (20) of the carrier rack. The locking assembly (24) contains a pair of coaxially mounted discs configured to interlock with one another in a variety of rotational positions. A mounting disc (30) is rigidly connected to the loadcarrying structure and interlocks with a locking disc (32). The outer surface of the locking disc (32) contains a channel (34) dimensioned to receive the nonhorizontal support member (20) therein. Angular slots (38) are provided in opposite walls at each end of the channel (34) to engage the nonhorizontal support member (20) in the locking assembly when the loadcarrying structure is rotated relative to the rack and the horizontal support member (18) is restrained by the clamping assembly (20).

8 Claims, 4 Drawing Figures

UNIVERSAL QUICK RELEASE MOUNTING ASSEMBLY

TECHNICAL FIELD

The invention pertains to apparatus for mounting accessories to vehicles and more particularly to a universal assembly for mounting and quickly releasing accessories to the supporting members of a vehicle.

BACKGROUND ART

The invention is applicable generally to the problem of mounting accessories to vehicles and specifically to the problem of mounting accessories to lightweight racing bicycles.

The cargo capacity of modern, lightweight bicycles is determined by the loadcarrying accessories installed by the cyclist. Modern lightweight bicycles, when purchased, usually do not have any substantial cargo carrying capacity. Cycle enthusiasts are often reluctant to increase the weight of the bicycle by installing permanent or semipermanent accessories such as baskets, saddlebags or the like. Light alloy carrier racks, which are not objectionable from the standpoint of increased weight or manageability, unfortunately have only limited cargo carrying capacity.

Most conventional accessories for bicycles, such as baskets, saddlebags, flag holders, liquid container holders and the like, are semipermanently attached to bicycle frames by brackets requiring use of tools. The time and effort required to mount and dismount these loadcarrying accessories make them undesirable to the serious cyclist. The most common quick release attachment system for baskets is a simple carriage bolt and wing nut used to clamp oblong metal plates between which are clamped and baskets. This structure is cumbersome to install, limits cargo capacity to a single container with a high center of gravity and frequently results in marring of painted or anodized surfaces due to metal to metal contact from vibration. Pannier, or saddlebags as they are more commonly called, are usually mounted by leather straps or hook-elastic systems which are subject to an inadvertent release, vibration and the progressive deterioration of materials.

Accordingly, there is a need for an apparatus for quickly mounting loadcarrying accessories to a bicycle or other vehicle which may be quickly dismounted without tools and which is engineered to eliminate contact with surfaces.

DISCLOSURE OF THE INVENTION

In accordance with the present invention, an assembly is disclosed for application to a wide variety of different accessories and carrier racks to facilitate mounting of accessories to and quick release from vehicles with concomitant advantages of stability, ease of installation and removal, and protection of painted and anodized surfaces from contact with the accessory.

According to one embodiment of the invention, a clamping assembly, rigidly mounted to an accessory, is provided for engaging a horizontal support member of the vehicle. The clamping assembly includes separate upper and lower jaws dimensioned to engage the horizontal support member therebetween. A bolt extending from the lower jaw passes through the upper jaw for compressing and releasing the jaws about the horizontal support member positioned therebetween. Rotation of a knob, threaded on the bolt, outside the upper jaw, permits adjustment of the compression exerted by the jaws. A separate releasable locking assembly connected elsewhere to the accessory is provided for receiving and engaging a nonhorizontal support member of the vehicle. The locking assembly contains a pair of coaxially mounted discs, configured to interlock with one another in a variety of rotational positions. The inner disc is rigidly connected to the loadcarrying structure and interlocks with the locking disc. The outer surface of the locking disc contains a channel dimensioned to receive the nonhorizontal support member therein. The channel is configured at one end of the disc to define a slot in the sidewall of the channel obliquely opening into the channel. THe channel defines a similar slot in the opposite sidewall thereof at the other end of the disc opening obliquely into the channel at the same angle as the first slot. The slots are dimensioned to engage the nonhorizontal support member in the locking assembly when the locking assembly is rotated relative to the support member into the first and second slots. After rotation of the locking assembly, the clamping assembly subsequently engages the horizontal support member, which maintains the nonhorizontal support member in its rotated, engaged position in the locking assembly.

BRIEF DESCRIPTION OF THE DRAWINGS

A more complete understanding of the invention and its advantages will be apparent from the following Detailed Description taken in conjunction with the accompanying Drawings in which.

DETAILED DESCRIPTION

The present invention finds application generally to the problem of mounting loadcarrying accessories to vehicles or to rack structures on vehicles, and specifically to the problem of mounting loadcarrying or load-bearing accessories such as baskets, saddlebags, and the like to bicycles to two wheeled vehicles. The invention also has application to other vehicles such as sailboats, automobiles and trucks, and it is generally applicable to the problem of mounting any accessory to the support members of a vehicle or vehicle rack.

As will be described in greater detail hereafter, the invention essentially employs two locking structures, both of which are distally mounted to the accessory. The locking structures are designed to receive and engage separate support members such that when one support member is received in the first locking structure, it becomes locked into the the first locking structure after the accessory is subsequently rotated relative to the vehicle into position for receiving a second support member in the second locking structure. The second support member is then engaged in the second locking device thereby firmly mounting the accessory to the vehicle. By reversing the steps, the accessory may be quickly dismounted from the vehicle.

Figure 1:
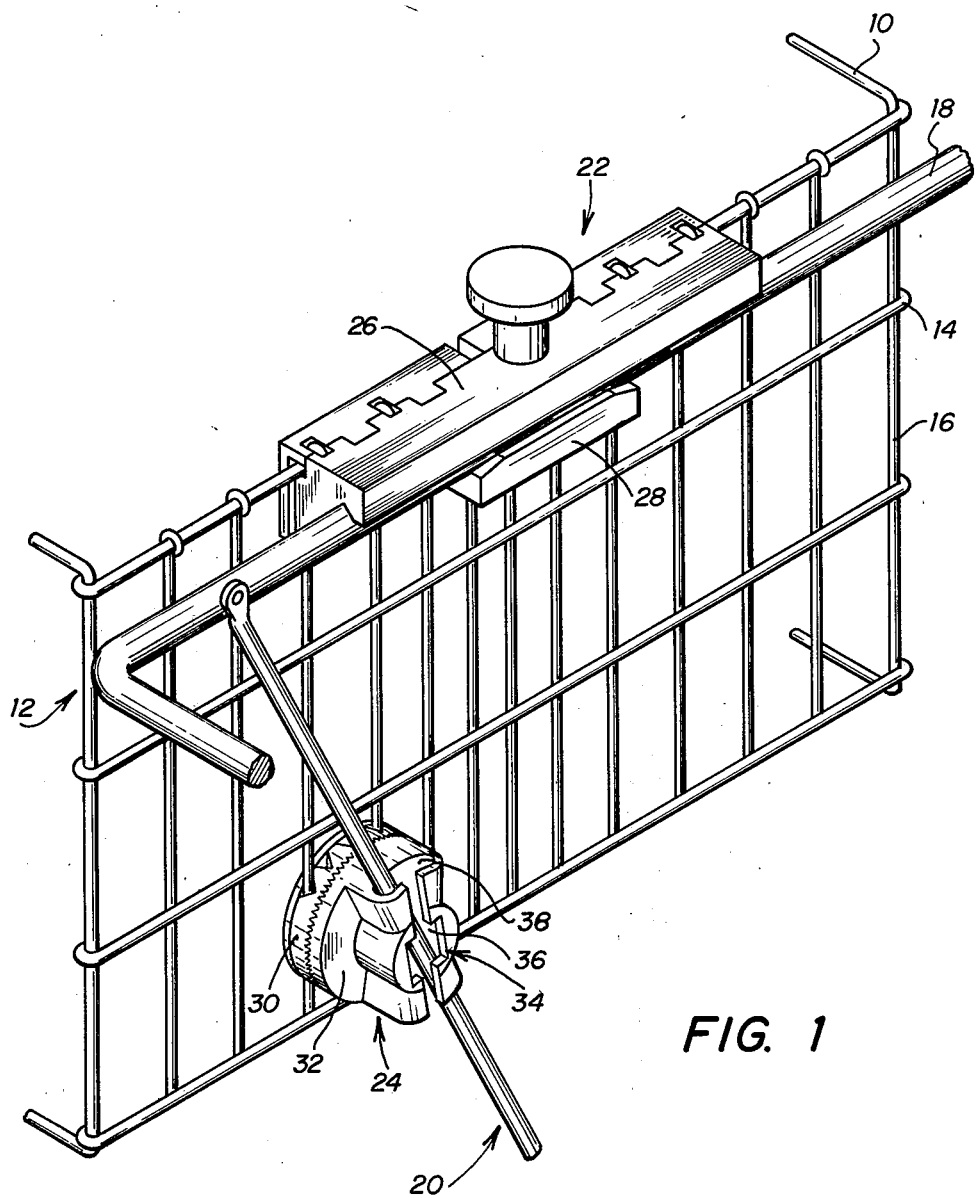
FIG. 1 is a front perspective view of the invention showing a conventional bicycle basket mounted to a carrier rack.
Figure 2:
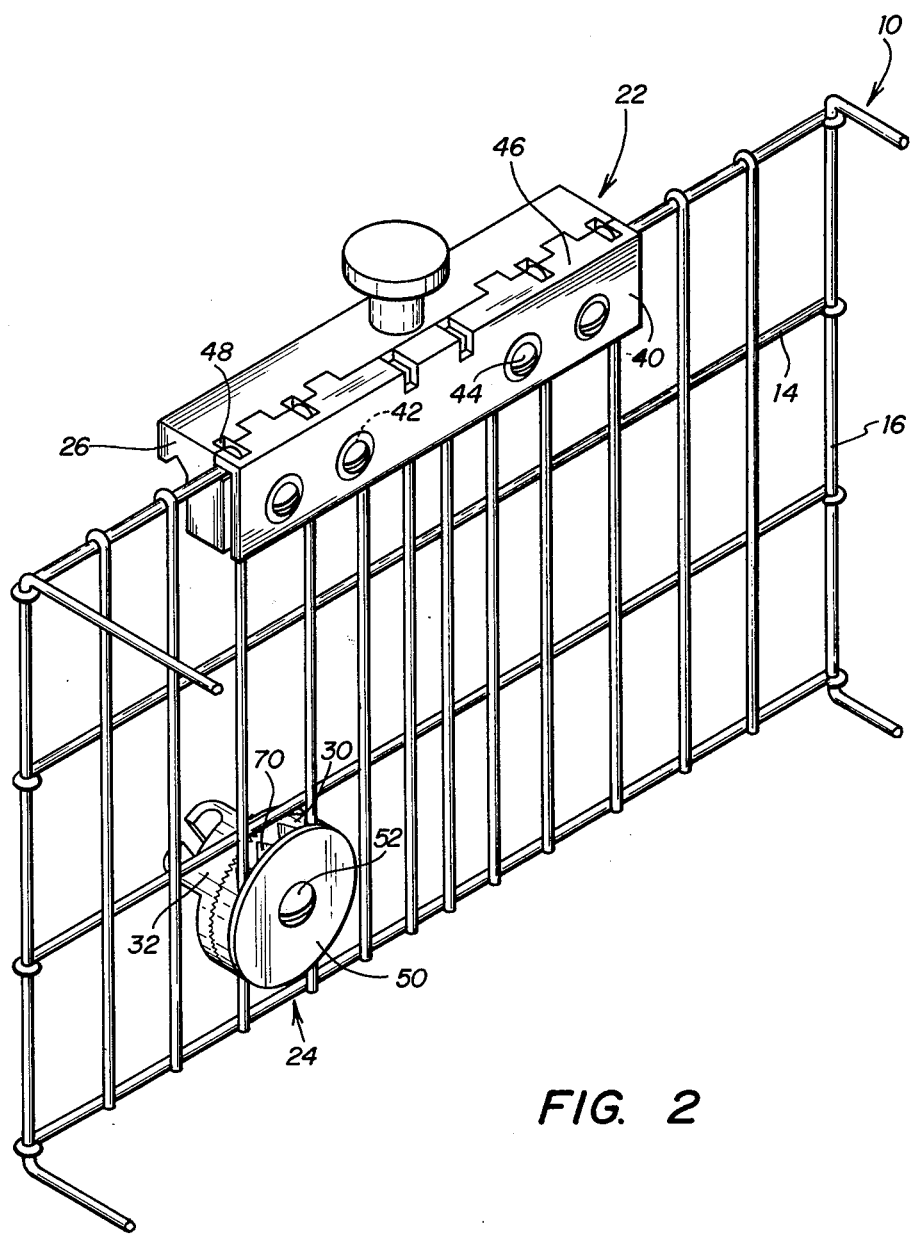
FIG. 2 is a rear perspective view of the invention showing a conventional bicycle basket mounted to a carrier.

FIG. 1 shows one particular embodiment of the invention in which the accessory is a metal wire basket 10, mounted to the carrier rack 12 of a conventional bicycle. The invention may also be used to mount a wide variety of other accessories to vehicles, such as flag holders, ice chests, liquid containers, brief cases, pannier bags and musical instrument cases. The basket 10 shown in FIG. 1 is a conventional wire basket commonly mounted on each side of the rear wheel of a bicycle, comprised of horizontal bars 14 and vertical bars 16. The carrier rack 12 shown in FIGS. 1 and 2 is the lightweight alloy type of rack frequently mounted behind the seat of a bicycle. Rack 12 is formed of horizontal support members 18 and a generally vertical nonhorizontal support members 20 which extend from support member 18 at an angle thereto to be connected to the bicycle frame adjacent the rear wheel axle. It will be appreciated that the invention is not limited in its use with a carrier rack or the particular carrier rack design illustrated in FIG. 1, but is adaptable to a wide variety of different rack designs or adaptable for use with other support members of the vehicle by making dimensional changes in the locking and clamping assemblies hereafter discussed.

In the preferred embodiment, the invention employs a hand releasable clamping assembly 22 and a releasable locking assembly 24, both of which are separately connected to basket 10 or any other accessory at different points. Generally, the locking and clamping assemblies 22 and 24 will be employed near the center of the accessory to facilitate the stabilization thereof. As will become apparent in the discussion that follows, locking assembly 24 may be operated at different orientations relative to clamping assembly 22 to accommodate nonhorizontal support members 20 positioned relative to horizontal support member 18 at various angles. In most, but not all applications, however, the nonhorizontal support member will be substantially vertical and more or less perpendicular to the horizontal support member.

The clamping assembly 22 which engages horizontal support member 18 contains an upper jaw 26 which coacts with a lower jaw 28 to receive and engage horizontal support member 18 therebetween. Locking assembly 24, which is mounted on the loadcarrying structure some distance from clamping assembly 22, is formed of two interlocking discs, and inner mounting disc 30, rigidly mounted to the basket 10 or other accessory, and an outer locking disc 32, which interlocks with disc 30 and which engages the nonhorizontal support member 20 of the rack.

As shown in FIG. 1, the outer surface of locking disc 32 adjacent the rack defines an elongated channel 34 extending across the surface of locking disc 32. Channel 34 is defined by sidewalls 36 and is open at each end at the periphery of the disc. Channel 34 is configured to have sufficient width and depth to receive the nonhorizontal support member 20 snugly therein.

At each end of channel 34 near the periphery of the disc, a slot 38 is formed in each sidewall 36 of the channel. Each slot 38 opens obliquely into and intersects channel 34 as shown in FIG. 1. Slots 38 are dimensioned to engage the nonhorizontal support member 20 therein once support member 20 has been received in the channel and the accessory and locking assembly fastened thereto has been rotated into engagement with two of the four slots 38 in one of two directions, as shown in FIG. 1. Subsequent engagement of the horizontal support member 18 by the clamping assembly 22, once support member 20 has been rotated into locking position, renders support members 18 and 20 immovable, locking the basket or other accessory to the rack. To disengage the basket from the rack or other support members of the vehicle, clamping assembly 22 is first released and the horizontal support member disengaged therefrom, which permits rotation of the locking assembly relative to the nonhorizontal support member 20 such that support member 20 is then parallel to the channel 34 from which it may be removed from the locking assembly.

As earlier mentioned, clamping assembly 22 and locking assembly 24 are both rigidly fixed to the basket 10 or other accessory. FIG. 2 illustrates the connection of the clamping assembly 22 to the basket 10. In the preferred embodiment, a retainer plate 40 may be employed. Retainer plate 40 is a piece of material having apertures 42 formed therein, through which a number of bolts 44 are secured with nuts on the opposite side of the upper jaw 26 of the clamping assembly. In the view shown in FIG. 2, the retainer plate 40 is provided with an upper flange 46, which also has a plurality of rectangular apertures 48 formed therein, appropriately dimensioned to permit the passage of vertical support bars 16 of the basket therethrough.

FIG. 2 also illustrates the mounting of locking assembly 24 to the accessory. A conventional steel washer 50 is employed to perform the same function of retainer plate 40. A bolt 52 is passed through the aperture of the washer and the mounting disc 30 to be embedded in locking disc 32 as hereafter described.

Figure 3:
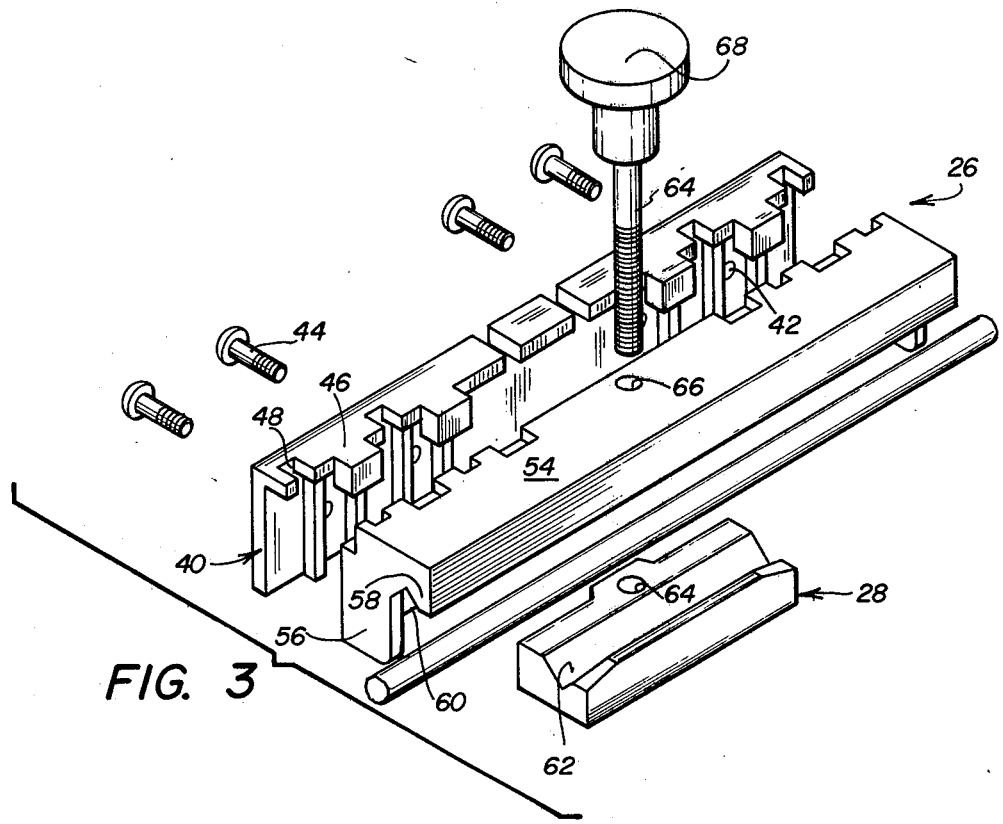
FIG. 3 is an exploded view of the clamping assembly shown in FIGS. 1 and 2.

Referring now to FIG. 3, the structure and operation of the clamping assembly 22 will be described in greater detail. The upper jaw 26 of the clamping assembly is an L-shaped structure having an upper portion 54 and a depending portion 56 through which bolts 44 passing through retainer plate 40 are secured with nuts.

A V-shaped groove 58 is formed on the lower surface of upper portion 54 along the length thereof, dimensioned to cradle horizontal support member 18. The backwall 60 of depending portion 56 defines a recess dimensioned to receive lower jaw 28 when clamping assembly 22 is tightened.

Lower jaw 28 likewise contains a V-shaped groove 62 on the upper surface thereof similarly dimensioned to groove 58 to cradle horizontal support member 18 when the upper and lower jaws are compressed. A bolt 64 mounted in lower jaw 28 passes through an aperture 66 in the upper portion 54 of the upper jaw and through an internally threaded knob 68 disposed above upper portion 54 outside the jaw. As knob 68 is turned counterclockwise on bolt 64, the upper and lower jaws compress the horizontal support member 18 disposed therebetween. A counterclockwise rotation of knob 68 releases the clamping assembly whereby the carrier rack may be disengaged from the basket 10 or accessory and the nonhorizontal support member then unlocked from the locking assembly 24. Thus, by hand operation of knob 68, the loadcarrying device may be quickly mounted or dismounted, without use of tools.

Figure 4:
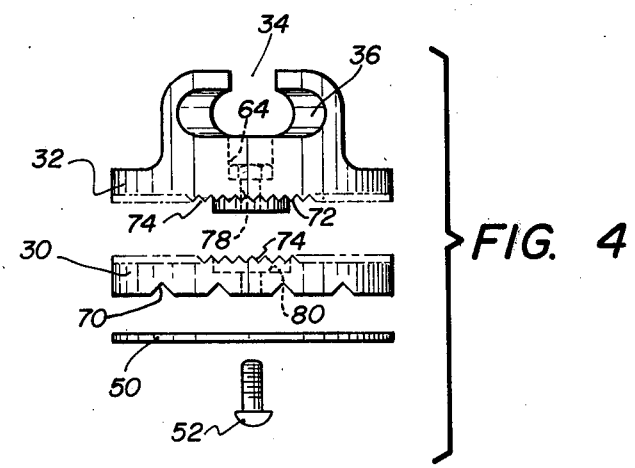
FIG. 4 is an exploded view of the locking assembly shown in FIGS. 1 and 2.

Referring now to FIG. 4, the structure and operation of the locking assembly 24 will be described in greater detail. As seen in FIGS. 2 and 4, in the preferred embodiment, the noninterlocking surface of mounting disc 30 adjacent the basket is provided with a plurality of parallel V-shaped grooves 70 dimensioned to interfit with vertical bars 16 of the basket 10 to prevent rotation of disc 26 relative to the basket when locking disc 32 is rotated relative to disc 30 as hereafter described. It will be understood, of course, that grooves 70 may not be necessary or desirable for use with other accessories and that in other applications different structure may be employed for enhancing the rotational stability of the mounting disc.

As seen in FIGS. 2 and 4, the interlocking surfaces of disc 30 and locking disc 32 are provided with a plurality of radially directed V-shaped ridges 72, between which ridges are formed V-shaped valleys 74, which ridges and valleys extend from and into the disc at 45° angles to the surface, thereby defining a serrated annular interlocking surface extending around the periphery of the disc, as shown in FIGS. 1 and 4. Ridges 72 on the interlocking surface of one disc are dimensioned to intermesh with valleys 74 on the other disc and vice versa. In the preferred embodiment, seventy-two equally spaced ridges and seventy-two valleys between adjacent ridges are provided on each disc 30 and 32, permitting disc 32 and channel 34 to be positioned at seventy-two different rotational positions relative to the mounting disc 30 or at 5° rotational increments. The interlocking feature of the invention makes the locking assembly capable of use with racks made by different manufacturers, as well as with variously positioned nonhorizontal support members of the vehicle. The usefulness of the interlocking feature is further enhanced by the use of the four slots 38 in the channel 34 which render any orientation of disc 32 lockable when the accessory and locking assembly are rotated in either direction relative to the vehicle.

To vary the orientation of channel 34 relative to the vehicle by any increment of 5°, bolt 52 is loosened, the locking disc 32 rotated relative to mounting disc 30 an appropriate multiple of 5° and bolt 52 is then retightened. Of course, a different number of ridges and valleys can be employed, depending upon the application, to obtain different rotational increments.

As earlier described, bolt 52 passes through mounting disc 30 and is threaded in locking disc 32. Locking disc 32 may be formed of plastic, as described below, with a nut 76 embedded in the interlocking surface as best seen in FIG. 4. Locking disc 32 may also contain a hollow axle 78 having a central aperture through which bolt 52 may pass extending from the disc 32 for rotation in central aperture 80 of inner disc 30 to preserve axial alignment of the discs and to facilitate rotation of disc 32 relative to disc 30.

In the preferred embodiment, the upper and lower jaws of the clamping assembly and the mounting and locking discs of the locking assembly are manufactured of glass reinforced polypropylene containing about 20% glass and resistant to ultraviolet radiation. This material, because of its durability and strength, is particularly suitable to mounting loadcarrying structures to the rack, while its softness will prevent marring of the rack and/or vehicle body if contact is made during vibration.

It will be appreciated that the foregoing description of the invention will not be limited to the specific embodiment recited herein, but is capable of general application to the problem of mounting an accessory to the support members of a rack or vehicle. Those skilled in the art will appreciate that the invention has general application to any structure having at least two nonparallel supporting members. In particular, the system will have use on automobiles, sailboats and other vehicles.

Although preferred embodiments of the invention have been illustrated in the accompanying Drawings and described in the foregoing Detailed Description, it will be understood that the invention is not limited to the embodiment shown and described but is capable of numerous rearrangements, modifications and substitutions of parts or elements without departing from the spirit and scope of the invention.

I claim:

1. For use in mounting an accessory to the support members of a vehicle, an improved mounting apparatus comprising:

a clamping assembly for being connected to the accessory, said clamping assembly having upper and lower jaws dimensioned to engage a first support member of the vehicle and a bolt, rigidly mounted to said lower jaw, passing through said upper jaw for tightening the jaw about the first support member, said clamping assembly also having a knob threaded on said bolt outside of said upper jaw compressing and releasing said jaws about the first support member; and a releasable locking assembly for being connected to the accessory adapted to receive and engage a second support member, said locking assembly having a pair of coaxially aligned discs adapted to interlock with one another in a plurality of rotational positions, said first disc being rigidly connected to the accessory and interlocking with said second disc, said second disc having a channel defined on the noninterlocking surface thereof for receiving the second support member, one end of said channel having a first slot formed in the sidewall thereof oriented obliquely toward the channel, the other end of the channel having a second slot formed in the opposite sidewall of the channel oriented obliquely toward the channel, said first and second slots configured to engage the second support member when said locking assembly is rotated relative to the vehicle, said channel also having third and fourth slots formed in the sidewall thereof opposite said first and said second slots, said third and fourth slots being obliquely angled to the channel at the same angle as said first and said second slots.

2. The apparatus of claim 1 wherein said first and said second discs and said upper and lower jaws are formed of glass reinforced polypropylene.

3. The apparatus of claim 1 wherein each of said first and said second discs contains a plurality of radially directed ridges disposed around the periphery thereof, the ridges on each of said discs dimensioned to intermesh with the ridges on the other of said discs whereby the channel on said second disc may be positioned in a variety of rotational positions relative to said first disc.

4. The apparatus of claim 3 wherein each of said discs contains 72 ridges.

5. The apparatus of claim 1 further comprising means for mounting said upper jaw to the accessory and means for mounting said first disc to the accessory.

6. In combination:

a bicycle;

a carrier rack formed of generally horizontal support members and nonhorizontal support members adapted to be connected to a bicycle frame;

an accessory adapted for use with said bicycle and capable of connection to the carrier rack; and a releasable mount for being connected to the accessory and capable of mounting and releasing the accessory to the carrier rack, said mount comprising a clamping assembly for receiving and engaging the generally horizontal support member of the rack and a separate locking assembly for being connected to the accessory for receiving and engaging a nonhorizontal support member of the carrier rack, said locking assembly comprising separate first and second coaxially aligned discs, said first disc adapted to be mounted to the accessory and having means for interlocking with the second disc, said first disc having a series of grooves formed on the surface thereof adjacent the accessory, said grooves being dimensioned to receive parallel members of said accessory to restrain rotational movement of said first disc, said second disc having an elongated channel formed on the surface thereof dimensioned to receive and engage said nonhorizontal support member therein, one end of said channel containing a first slot formed in a sidewall thereof oriented obliquely to the channel and the other end of said channel containing a second slot formed in the opposite sidewall thereof oriented obliquely to the channel at the same angle as said first slot, said first and second slots dimensioned to engage the said nonhorizontal support member when said nonhorizontal member is positioned in said channel and said accessory is rotated relative to said rack, said clamping means having upper and lower jaws for receiving and engaging the horizontal support member to prevent further rotation of the accessory relative to the rack when said nonhorizontal support member is engaged by said locking assembly.

7. The combination of claim 6 wherein said accessory is a wire basket.

8. The combination of claim 6 further comprising a bolt rigidly mounted on said lower jaw and slidably passing through said upper jaw and a knob threaded on said bolt outside of said upper jaw.

* * * * *